(No Model.)
J. HAISH.
COMBINED FREIGHT AND PASSENGER CAR.
No. 479,068. Patented July 19, 1892.
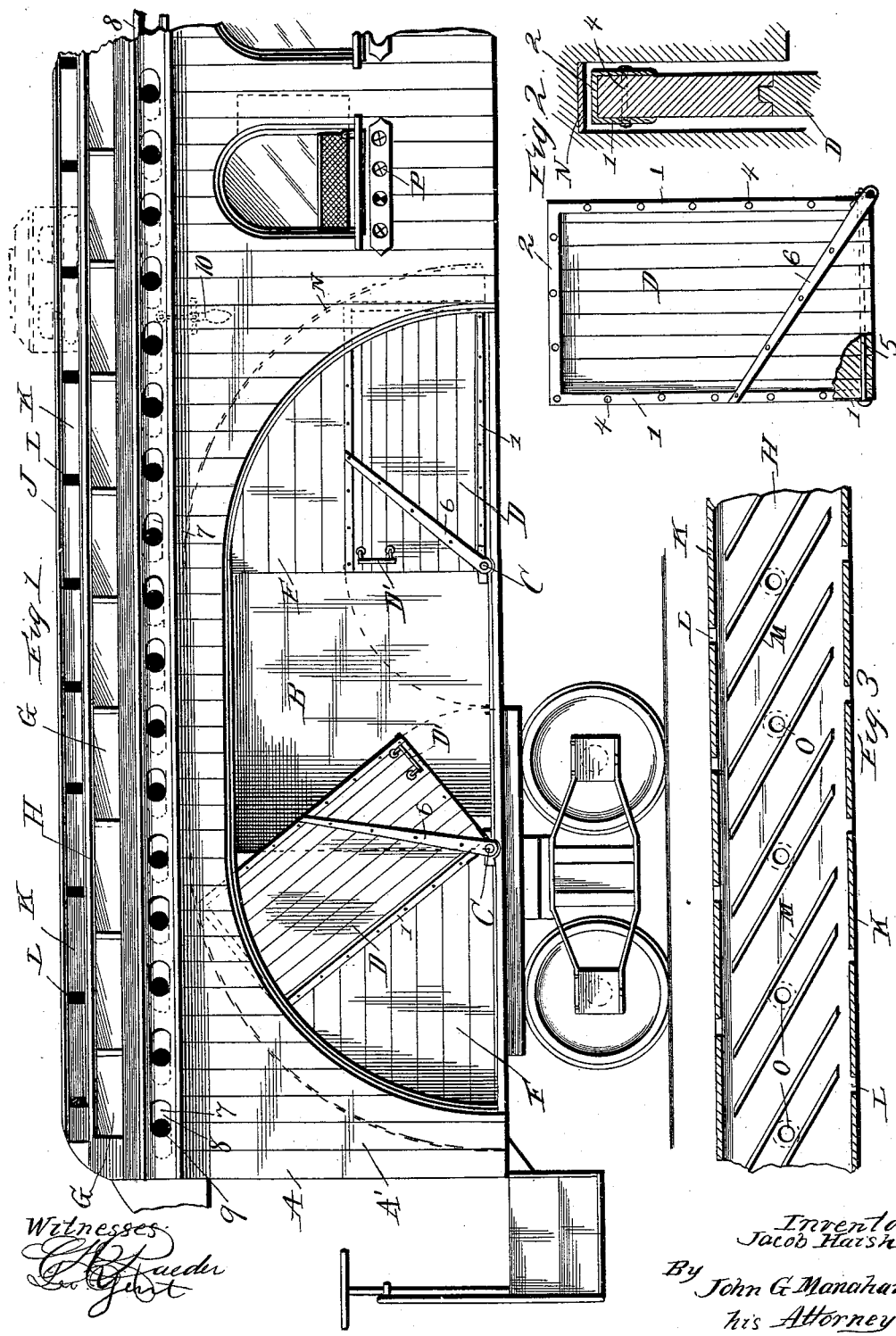
Inventor
Jacob Haish
By John G. Manahan
his Attorney
Witnesses

UNITED STATES PATENT OFFICE.

JACOB HAISH, OF DE KALB, ILLINOIS.

COMBINED FREIGHT AND PASSENGER CAR.

SPECIFICATION forming part of Letters Patent No. 479,068, dated July 19, 1892.

Application filed January 23, 1890. Serial No. 337,862. (No model.)

*To all whom it may concern:*

Be it known that I, JACOB HAISH, a citizen of the United States, residing at De Kalb, in the county of De Kalb and State of Illinois, have invented certain new and useful Improvements in Combined Freight and Passenger Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in combined freight and passenger cars, and the advantages of the same are applicable to either passenger or freight cars.

The objects of my improvements are, first, to provide a door pivoted at its lower outer corner and adapted to be careened from the opening, and thereby folded back against the side of the car either within or without the latter; second, to provide a step near the inner lower corner of such door, which may also be utilized as a handle for the latter; third, to afford a mode of construction for the car-door which will hold the parts constituting the same in a vise-like grip and permit the removal and replacing of the parts constituting the same in case of breakage of one or any of them; fourth, to afford facilities for a ready and proper ventilation of the car, and, fifth, to provide means for permitting the air to freely circulate over and across the deck of the car to prevent intense heating of the roof of the latter. I attain these objects by the construction illustrated in the accompanying drawings, in which—

Figure 1 is a side elevation of part of a combined freight and passenger car provided with my invention. Fig. 2 is a detail in side view and cross-section of the construction of the door. Fig. 3 are details of the mode of ventilation.

A is the car-body. B is the door-opening in the side thereof.

D D are twin doors, which when both are in a vertical position effectually close the opening B. The doors D are pivotally seated, respectively, at their lower corners at the lower corners of the opening B, and are adapted thereby to be turned toward the end of the cars, respectively, to open a passage through B and to be turned in a vertical position to close said passage.

In Fig. 1 one of the doors is represented as being turned or folded back upon its side, where it is held by its own gravity and the other in position of being turned either inwardly or outwardly. In the movement of the doors D their pivotal seat C is their center of motion. This construction not only dispenses with the inconvenience of sliding the doors in ways, but also when the doors are turned back upon their sides they open the entire area of the opening B. In moving the doors a leverage is exerted upon the pivotal seat C, which, though the latter be sufficiently tight to prevent rattling, renders the movement of the doors comparatively easy. On the outer face of each door D, near its lower inner corner, is formed a step D', which serves the double function of a handle and step, to be utilized as the latter when one of the doors is shut and the other open. The normal outside of the car is formed of perpendicular boards A', grooved together, and in that portion of the car into which the doors D are folded there is provided an inner sheeting F, consisting of grooved horizontal boards projected behind the board A' a sufficient distance therefrom to form an interval F' between boards F and A' to receive and guide the doors D in their oscillation aforesaid. This interval will retain the doors D when open without other attachments, and when the doors D are closed they can be held or locked in any suitable mode.

Referring to Fig. 2, 1 1 are channel-irons forming the side margins of the door, and 2 the channel-iron forming the top thereof. The irons 1 and 2 are adapted to receive in their internal channel the top and front and rear edges of the door D adjacent thereto. Bolts 4 4 through the channel-irons clamp the adjacent edges of the door D in place, and a rod 5, provided at one end with a head and at the opposite end with a thread and nut, is passed through the lower ends of the sides of the iron 1 and under or through the bottom of the wood portion of the door D and serves to hold the parts constituting the wood portion of the door D in a vise-like grasp, which can be tightened as said boards may shrink; also, by removing the rod 5 new boards can readily be substituted for any portion of those in the door D, which may casually become broken.

In the application of my invention to cars constructed in the ordinary way, or, if preferred, in the construction of new cars, the door D may be adapted to fold within the car or against the outside thereof, in either case being guided and held by a segmental fender N, suitably attached at each end to the car and affording space between its main body and adjacent side of the car for the passage of the upper portion of the door D. A brace 6, seated on the pivot C and extended diagonally across the outer or inner face of the door D and suitably fastened thereto, assists in strengthening the connection of said door to its pivotal seat C.

With obvious changes the doors D can be adapted to operate as end doors of the car and in such situation may be either in two parts on the same horizontal plane, as shown in Fig. 1, or they may be seated one above the other and folded in opposite directions. The same principle of pivoting and folding may be applied to a screen or guard across the lower end of the windows in either freight or passenger cars, such screen being adapted at such time as the window may be raised to be folded across the lower portion of the window, and thus prevent the falling out of parcels or small children or dangerous exposure of arms, and in the meanwhile the screen will permit the free circulation of the air to substantially the same extent as though the space were entirely clear. When the window shall be closed, there being no longer any necessity for the screen, the latter may be folded into the side of the car and be there retained by its own gravity in substantially the mode herein described in reference to the door D. A series of openings 7 are formed along the upper portion of the car, of such size and frequency as may be desired, and the slide 8, having corresponding openings 9, is adapted to reciprocate lengthwise of the car, and thereby open and close the openings 7, either wholly or partially, as may be desired. A lever 10, suitably fulcrumed centrally to the car A on the inside thereof and attached at its upper end to the slide 8, affords means of readily opening or closing the openings 7 or adjusting them to any degree. (See Fig. 1.) Above the series of adjustable ventilators 7 there is placed a series of fixed transoms G, intended to afford additional light to the car.

Directly above the roof H there is provided an upper supplemental roof or deck J to not only protect the lower roof H from the direct rays of the sun and the warping and shrinking resulting thereform, but also to afford a passage for the ready transit of the air between the roof H and deck J, and thereby keep the former cool and to permit the air to pass downward through the roof H into the interior of the car, as hereinafter described. Between the roof H and deck J there are placed longitudinal strips K in series, which are suitably attached to the roof H and support the deck J near the sides of the latter. The deck J may be as wide as the roof H or it may extend over but a narrow central strip of the latter. Such lateral contraction of the deck J is more specially adapted to freight-cars, when said deck will serve as the usual central foot-board. The strips K are of such length as may be desired and have air-openings L between their adjacent ends. Between strips K are placed on the roof H diagonal strips M of the height as the strips K or to fill vertically the space between H and J. The strips M project, respectively, across the openings L in the strips K, whereby the air entering such openings is deflected endwise on the roof of the car instead of passing transversely across it. Sufficient space is left between the ends of the diagonal strips M and the strips K for the passage of air around the ends of the strips M. Between the strips M there is provided openings O in the roof H, suitably furnished with an adjustable ventilator-slide of any of the usual forms adapted to be regulated or closed from the interior of the car. The access of the exterior air to the openings O is so indirect from the openings L that the air is practically divested of dust and cinders before it reaches said openings. Ventilating-openings P can also be formed under the windows of the car, controllable by the occupant on the inside.

For the adjusting devices of ventilating-openings O and P, I would recommend the species shown in my patent on "roofs," granted July 24, 1888, No. 386,465, and, if desired, the slide 8, which controls the opening 7, may be made in sections opposite each seat, to be controlled by the occupant thereof.

If desired, the roof may be provided centrally with an ordinary dome, also furnished with transoms G of such number and size as may be deemed requisite.

It will be understood that each side of the car is similarly constructed and that the description and illustration heretofore of one side are equally applicable to the other.

What I claim as my invention, and desire to secure by Letters Patent of the United States, is—

1. In a combined freight and passenger car, the combination of the roof H, the imposed roof J, and intermediate supporting-strips K, provided with openings L, and intermediate strips M, placed diagonally between the strips K and projected across the openings L therein, substantially as shown, and for the purpose described.

2. In a combined freight and passenger car, the combination of the roof H, provided with adjustable ventilating-openings O, the deck J, interposed longitudinal strips K, provided with openings L, and diagonal intermediate strips M, projected past said openings, substantially as shown, and for the purpose described.

In testimony whereof I affix my signature in presence of two witnesses.

JACOB HAISH.

Witnesses:
CHARLES H. SALISBURY,
SAML. P. BRADSHAW.